United States Patent [19]

Harada et al.

[11] Patent Number: 5,970,602
[45] Date of Patent: Oct. 26, 1999

[54] HEAD ACTUATOR ASSEMBLY AND METHOD FOR FABRICATING THE SAME

[75] Inventors: Yoshinao Harada, Chigasaki Kanagawa-ken; Yoshiaki Sonobe; Hajime Tokumitsu, both of Kanagawa-ken; Kazuya Takeda; Keiichi Iwasaki, both of Fujisawa, all of Japan

[73] Assignee: International Business Machines Corporation, Armonk, N.Y.

[21] Appl. No.: 08/922,806

[22] Filed: Sep. 3, 1997

Related U.S. Application Data

[63] Continuation of application No. 08/526,112, Sep. 8, 1995, abandoned.

[30] Foreign Application Priority Data

Sep. 16, 1994 [JP] Japan .................................. 6-3058752

[51] Int. Cl.⁶ .................................................. G11B 5/127
[52] U.S. Cl. ...................................... 29/603.06; 360/104
[58] Field of Search .......................... 29/603.03, 603.04, 29/603.06, 604, 607; 360/104

[56] References Cited

U.S. PATENT DOCUMENTS

| | | | |
|---|---|---|---|
| 4,761,699 | 8/1988 | Ainslie et al. | 360/103 |
| 4,996,623 | 2/1991 | Erpelding et al. | 360/104 |
| 5,111,351 | 5/1992 | Hamilton | 360/104 |
| 5,140,482 | 8/1992 | Kimura et al. | 360/104 |
| 5,282,103 | 1/1994 | Hatch et al. | 360/104 |
| 5,408,373 | 4/1995 | Bajorek et al. | 360/104 |
| 5,452,151 | 9/1995 | Money et al. | 360/75 |
| 5,491,597 | 2/1996 | Bennin et al. | 360/104 |
| 5,539,596 | 7/1996 | Fontana et al. | 360/104 X |
| 5,561,570 | 10/1996 | Gill et al. | 360/104 |

FOREIGN PATENT DOCUMENTS 53-19015  2/1978  Japan .................................. 360/104

OTHER PUBLICATIONS

Reidenbach, IBM Technical Disclosure Bulletin, vol. 22, No. 4, Sep. 1979.

IBM Technical Disclosure Bulletin, vol. 38, No. 03, Mar. 1995.

*Primary Examiner*—David P. Bryant
*Attorney, Agent, or Firm*—Merchant & Gould P.C.

[57] ABSTRACT

A thin metal plate, which is a material for forming load beams, is integrally formed with carriages extending from flexures, VCM coil sections, and a support plate for a flexible substrate. The signal output lines from the magnetic heads, and the signal lines from the VCM coil sections are connected directly and integrally to the flexible substrate without a soldering connection.

17 Claims, 15 Drawing Sheets

PRIOR
ART

HEAD ACTUATOR ASSEMBLY AND METHOD FOR FABRICATING THE SAME

This is a continuation of application Ser. No. 08/526,112, filed Sep. 8, 1995, now abandoned.

BACKGROUND OF THE INVENTION

1. Field of the Invention

This invention relates in general to a head actuator and method for fabricating the same, and more particularly, to a head actuator and a method for fabricating the same which reduces manufacturing cost and promotes the thinning of a shape to reduce the danger of contact being made between the wiring and the disk.

2. Description of Related Art

Due to increased competition among hard disk drive manufacturers, hard disk drive technology continues to advance at a rapid pace. Hard disk drives are required to provide higher-speed operation, be more compact and inexpensive, and to deliver a lower power dissipation. However, these goals are often difficult to achieve. For example, the need to make hard disk drives more compact leads to manufacturing difficulties and increased cost.

An important component is a hard disk drive is the head actuator. As illustrated in FIG. 14, a head actuator typically includes a flexible cable 200, head suspension assemblies 201 and 202, a carriage 203, and a VCM coil 204, which are coupled by screws, swaging, and adhesion.

Each of the head suspension assemblies 201 and 202 among them comprises a head assembly and a suspension assembly, as shown in FIG. 15.

The head assembly is a subassembly in which the end portions of urethane-covered wires 302 and 303 are covered with insulation tubing 301. The wiring is stripped by an excimer laser and welded to a magnetic head 300 by soldering or supersonic wave bonding. The suspension assembly is a subassembly in which a flexure 310 and a load beam 320 are welded and the load beam 320 and a base plate (or mounting plate) 330 are welded.

The head suspension assemblies 201 and 202 are completed by putting the head assembly and the flexure 310 together with an anaerobic adhesive and then fixing the insulation tubing 301 with clip components 321 to 323.

It is to be noted that there are some cases in which a damper plate 340 is adhered through an adhesive 341 to the load beam 320 to restrain the vibration and resonance of the load beam 320.

Now referring to FIG. 16, there has also been proposed a suspension assembly which dispenses with a flexure by finely working one end 400A of a load beam 400 into such a spring structure so as to maintain the attitude of a magnetic head when it floats.

The prior-art head suspension assembly shown in FIG. 15 is a structure having a bent portion 311 and a dimpled portion 312. Thus, the thicknesses of these portions are added up to the thickness of the flexure 310 itself. Further, the thickness of the insulation tubing 301 and the thickness of the clip components 321 to 323, for fixing the insulation tubing 301, also contribute to the thickness. It was therefore difficult to make the head suspension assembly thin.

Also, there is a danger of such an insulation tubing 301 contacting a disk. Further, it is conceivable that soft errors and the like are eventually increased. As a hard disk drive is made thinner, the space between a plurality of stacked disks becomes narrower and, if such an insulation tubing 301 is used, the possibility of contacting the disk will become greater and greater and, consequently, the insulation tubing 301 has become an obstacle to the promotion of the thinning of the shape involved.

As shown in FIG. 13, the base plate 330 is welded to the load beam 320 for joining with the carriage 203. For this reason, the thickness of the carriage 203 and thickness "t" of the base plate 330 (See FIG. 15) contribute to the thickness thereby making the thinning much more difficult.

Also, if the thinning is forcibly performed, there will be the drawback that the swaging force becomes lower, the base plate 330 is warped and lifts the load beam 320, and consequently the load changes.

On the other hand, when this magnetic head 300 and the urethane-covered wires 302 and 303 are bonded, the coverings of the urethane-covered wires 302 and 303 must be stripped by an expensive excimer laser, so this becomes a main cause of high cost.

Further, the work for putting two or four urethane-covered wires 302 and 303 into the insulation tubing 301 becomes necessary but, since the urethane-covered wires 302 and 303 themselves are flexible, the automation of the work is not easy, so this has become another main cause of high cost.

Also, as described above, the damper plate 340 is sometimes adhered through the adhesive 341 to restrict the vibration and resonance of the load beam 320 but, in such a case, a series of processes, such as the coating of the adhesive 341, pressing, tearing of mold separation papers, and adhering to the load beam 320, become necessary in addition to the working process of the load beam 302. Consequently, this also adds to the manufacturing cost.

Further, as is evidenced by the head actuator in its disassembled state is shown in FIG. 13, the carriage 203 is disposed for holding of the above-described head suspension assemblies 201 and 202, positioning them in the direction of thickness to the pivot bearing 210, positioning of the axis of rotation of the head actuator rotational motion, holding of the VCM coil 204, and , with reference to FIG. 14, connecting with a movable portion 212 of a movable flexible cable 200.

As a first problem with the carriage 203, there was the possibility that highly accurate working could not be performed, because, in the conventional mechanical working method, the carriage 203 becomes extremely thin in obtaining the needed thinning of the carriage 203.

Further, on the one hand, a coil holding portion 203 of the carriage 207 needs a minimum thickness for maintaining the coil holding strength. For that reason, there is the drawback that the rotational region of the VCM coil 204 is subjected to a limitation and also the torque becomes lower because coil width "d1" cannot be made large.

On the other hand, the fabrication process of the VCM 20 coil 204 is a process of winding a self-fusion welding wire around a mold in a row and performing fusion-welding by exposing the wire to a hot blast of air. However, if the VCM coil 204 is thinned into one layer or two layers, there will arise the drawback that the strength of the fusion-welded layer becomes insufficient and therefore the VCM coil 204 is unwound.

Still further, as shown in FIG. 14, the flexible cable 200 has a bracket 213 of a polyester imide or an aluminum material adhered to one end of the movable portion 212 thereof. Also, on the opposite side of the movable portion 212 a module (not shown) is installed for amplifying an output of the magnetic head 300, and clip components. And, for the installation, a support plate 215 made of polyester imide, an aluminum material or a stainless material is adhered to the back of the movable portion 212 with thermosetting resin.

However, there is the drawback that the width of a pad 216 on the bracket 213 for soldering the head wire and the amplifier module together becomes insufficient as the pad 216 is made thinner. There is also the drawback that, since the pad 216 becomes smaller, it easily comes off during soldering.

It can be seen then that there is a need for a head actuator and a method for fabricating the same which reduces manufacturing cost.

It can also be seen then that there is a need for a head actuator and a method for fabricating the same which promotes the thinning of a shape to reduce the danger of contact being made between the wiring and the disk.

SUMMARY OF THE INVENTION

To overcome the limitations in the prior art described above, and to overcome other limitations that will become apparent upon reading and understanding the present specification, the present invention discloses an integrally formed actuator and method of fabricating the same.

The present invention solves the above-described problems by providing a method of fabricating the head actuator which reduces cost and promotes the thinning of a shape to reduce the danger of contact between the wiring and the disk.

A system in accordance with the principles of the present invention comprises a head actuator assembly having a flexure for supporting a magnetic head, a movable carriage, supported on a main part of a disk drive, for holding and positioning the flexure, and a load beam on which the flexure is elastically deformable and supported, the load beam being integrally formed with the flexure and the carriage. The head actuator further comprising a deformable flexible substrate which is integrally formed with signal lines connected to the magnetic head and a movable coil portion for moving the carriage with a sheet of conductive material. The signal lines may be connected to the magnetic head and further deposited and arranged on the load beam, while adjacent to a ground line.

An insulation layer of an organic compound is coated and interposed between a first metal material having a spring and a second conductive metal material. These metal materials are laminated to form a composite material.

Both sides of the composite material are coated with a photosensitive material and an unnecessary portion is removed by mask exposure. Then, a necessary portion on the second metal material is selectively masked and an unmasked portion is plated with a thick metal film. Further, a magnetic head is installed on the composite material. Accordingly, the signal lines from the magnetic heads do not need to be covered with insulation tubing and a main factor for high cost resulting from the use of urethane covered lines is eliminated.

Therefore, since the signal lines are deposited and arranged on the load beam, there is no danger of contact between wiring and a disk, and thinning of a shape of a head actuator becomes easy. In addition, since the signal lines are written directly on the load beam and deposited on the load beam, mass production also becomes easy.

One aspect of the present invention is that clip components for fixing the insulation tubing do not need to be provided and therefore the thinning of a shape can be promoted.

Another aspect of the present invention is that since the load beam, the flexure, and the carriage are integrally formed with the composite material, it becomes unnecessary to provide them individually and join them together.

Another aspect of the present invention is that since it becomes unnecessary to provide a base plate, the thinning of a shape becomes easy.

Another aspect of the present invention is that since the components are integrally formed with the composite material, the head actuator can be effectively prevented from vibrating.

Yet another aspect of the present invention is that a series of processes for adhering damper plates become unnecessary and therefore a reduction in the cost is further promoted.

Yet another aspect of the present invention is that if a stainless plate is used as the first metal material, the corrosion resistance of the first metal thin plate will be enhanced, Still another aspect of the present invention is that if a polyimide semipolymer is used as the insulation layer, the first metal material and the second metal material will be reliably joined by the polyimide semipolymer.

Another aspect of the present invention is that if a rolled copper leaf is used as the second metal thin plate, the conductivity of the second metal material will become better.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
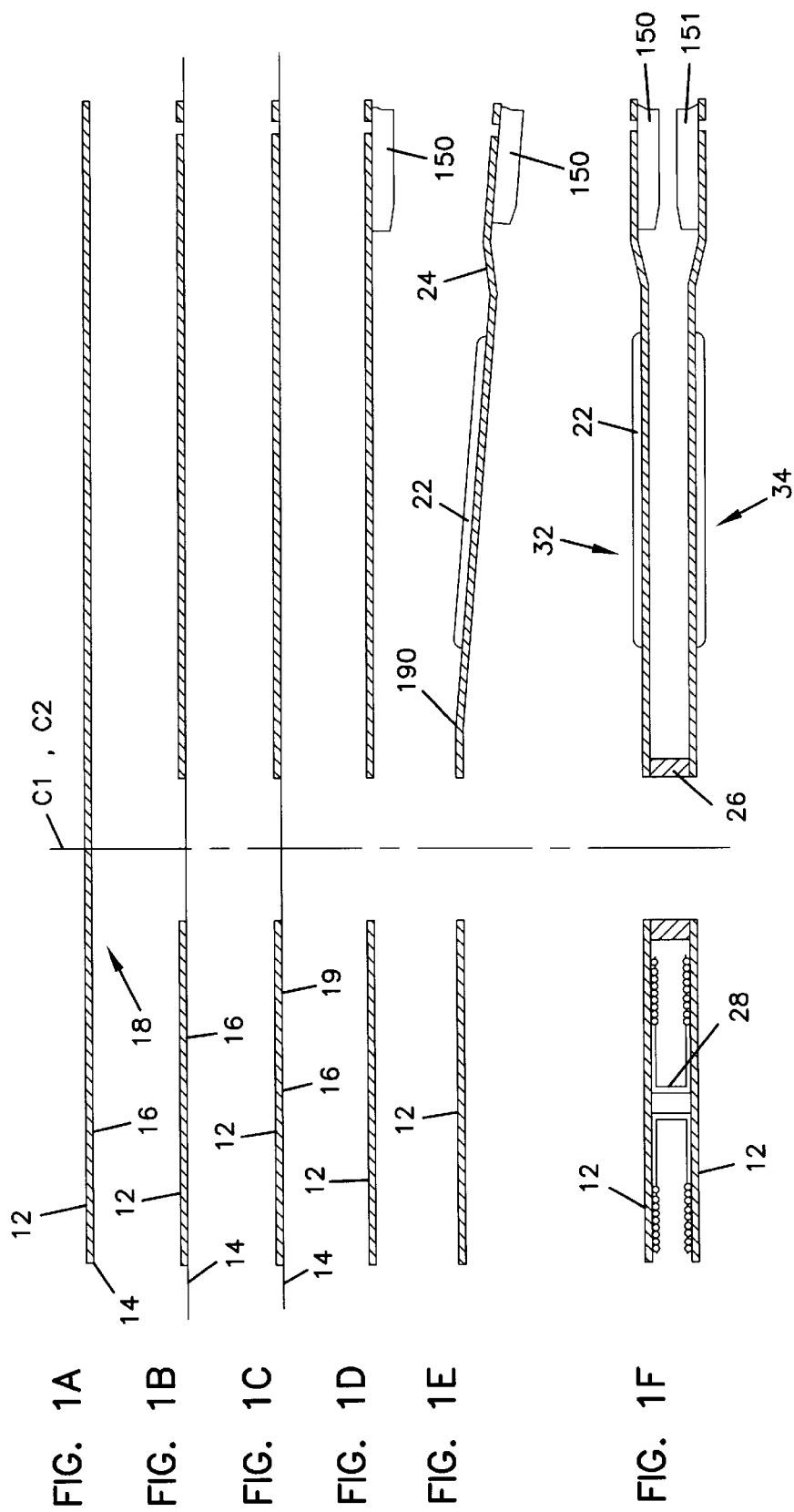
FIGS. 1(A)–(F) illustrate the construction of a head actuator according to a first embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method of fabricating the head actuator which reduces cost and promotes the thinning of a shape to reduce the danger of contact between the wiring and the disk.

FIGS. 1(A)–(F) illustrate a fabrication method for a head actuator for a hard disk drive according to a first embodiment. As shown FIG. 1(A), a thin film layer 14 is formed by coating the surface of a first thin metal plate 12 having a spring. For example, the first metal plate may be any one of phosphor bronze, beryllium copper, etc. The thin film layer 14 is formed by coating the first metal material 12 with an organic compound. For example, the coating may be any one of polyimide semipolymer, epoxyester semipolymer, etc. The organic compound provides flexibility and becomes an insulating material electrically.

A composite material 18 is formed by depositing a second thin metal plate 16 having conductivity on the thin film layer 14 in its semihardened state. For example, the second thin metal plate may be any one of rolled copper leaf, phosphor bronze, etc.

An etching process by optical lithography is then performed. In this etching process, mask exposure is performed after both sides of the composite material 18 have been coated with a photosensitive material.

Figure 2:
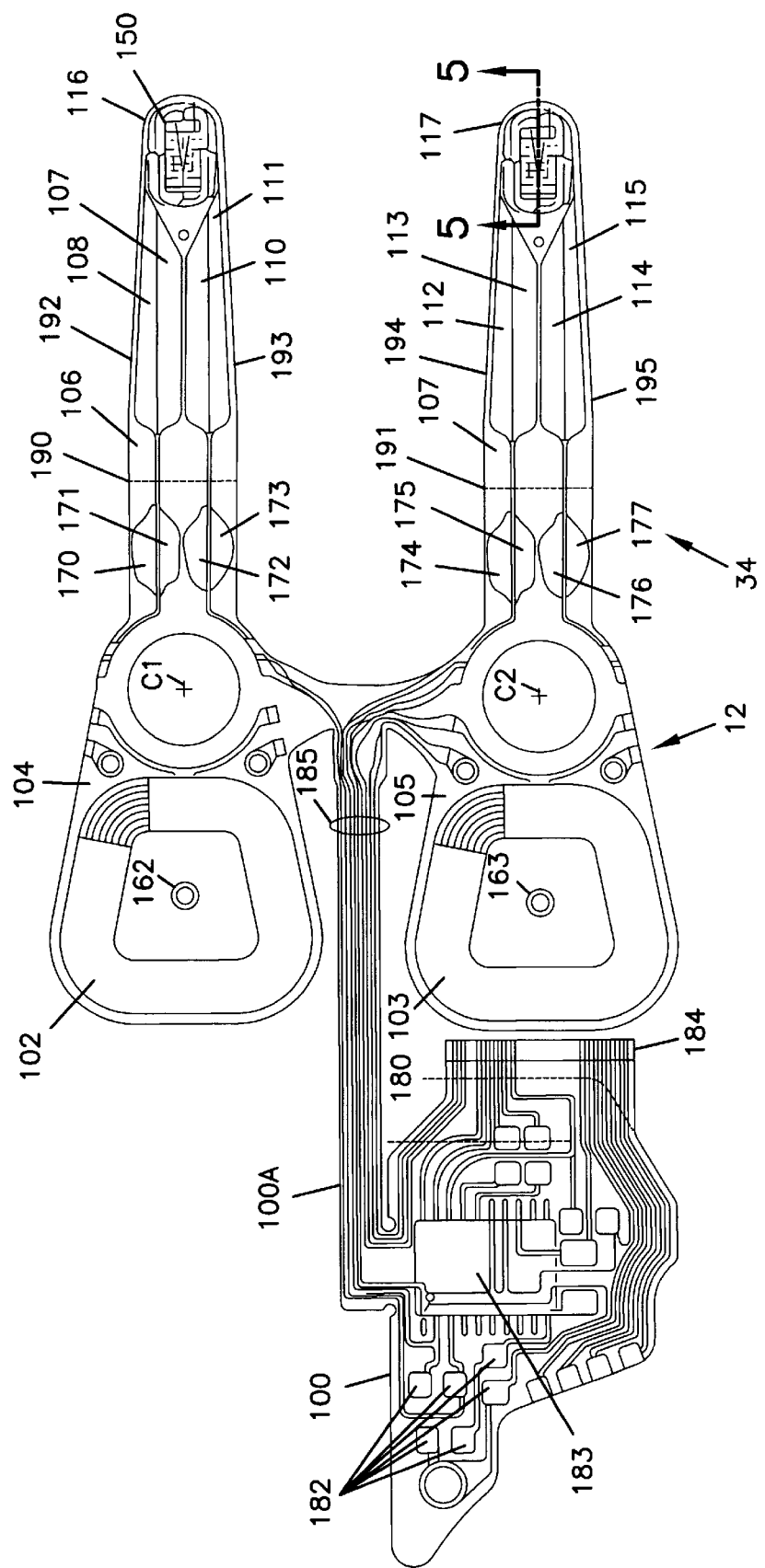
FIG. 2 is a plan view of the head actuator according to the first embodiment of the present invention.

More particularly, as shown in FIG. 2, patterns for flexures 116 and 117, load beams 106 and 107, carriages 104 and 105, and a support plate 180 of a flexible substrate 100 are respectively exposed on the side of the metal plate 12. Conductive patterns for head circuits 134 to 137 for pulling outputs from magnetic heads 150 and 151, output signal lines 108 to 115 and 170 to 177 on the load beams 106 and 107, VCM coil sections 102 and 103, and the flexible plate 100 are respectively exposed on the side of the thin metal plate 16 opposite to the side of the thin metal plate 12.

Unexposed portions are then removed with developer solution. Note that, for the negative material, etching is further performed. Unnecessary areas are removed by spraying with a hydrofluoric acid solution of, for example, ferric chloride or copper chloride.

Thereafter, the photosensitive material is dissolved and removed, and a section such as that shown in FIG. 1(B) is obtained. Selective electroplating is then performed on the side of the thin metal plate 16. In this process, the thin metal plate 16 is selectively masked by screen printing or optical lithography, using a plating resist having a resistance to the plating solution, and the opening areas unmasked are plated with a thick metal film by electroplating.

Figure 3:
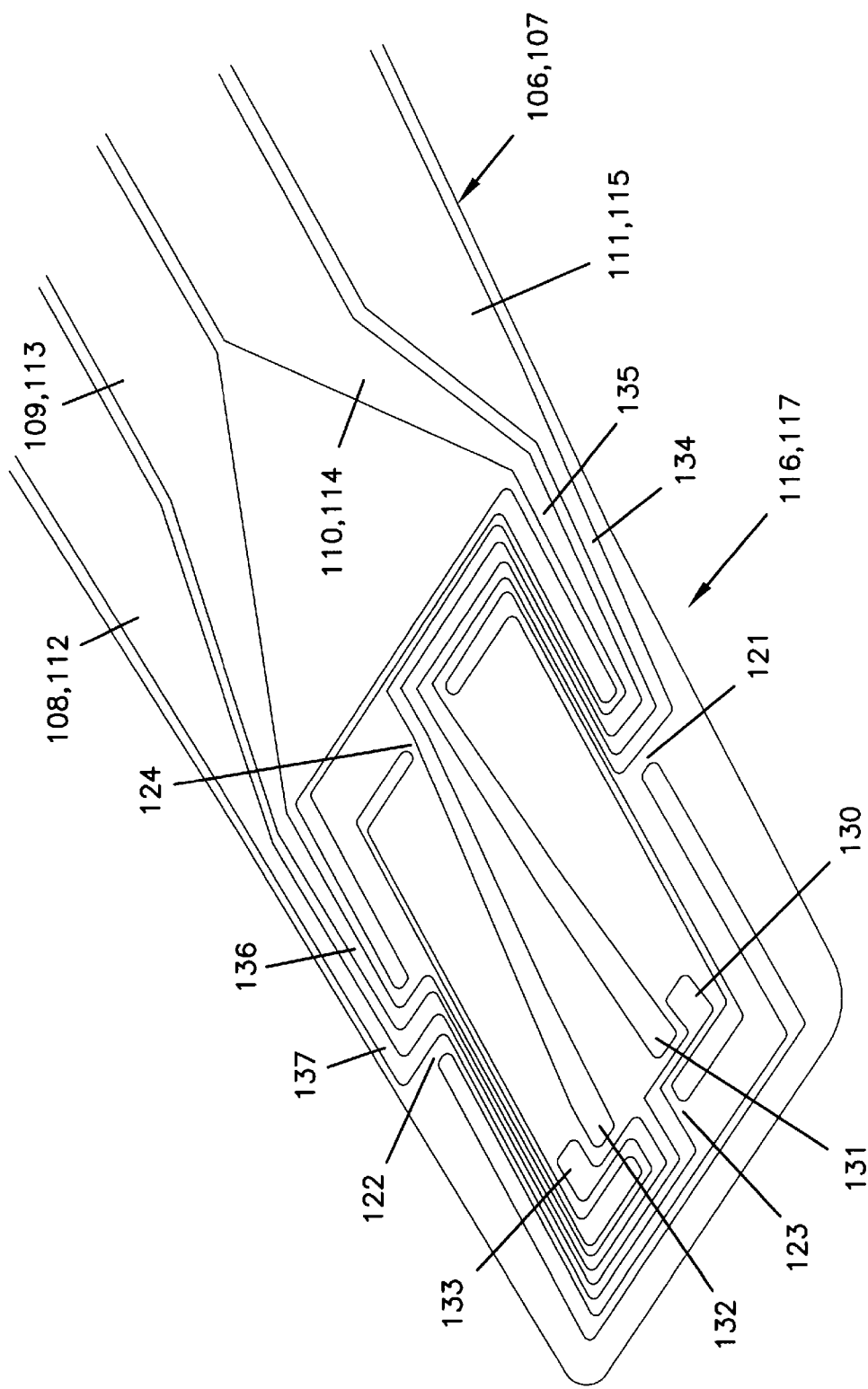
FIG. 3 is an enlarged perspective view of the flexure of the head actuator according to the first embodiment of the present invention.

More particularly, as illustrated in FIG. 3 four bridge portions 121 to 124 of the flexures 116 and 117 whose thicknesses are critical, as illustrated in FIG. 2, bent portions 190 and 191 on the load beams 106 and 107 for generating a gram load, and the movable portion 100A of which the flexibility of the flexible substrate 100 is required are masked. The unmasked opening areas are respectively plated with a thick metal film. After plating, the plating resist is removed.

It is to be noted that, for through bores 162 and 163, the lower bores of the through bores 162 and 163 are formed in the previous process preceding the electroplating process.

As described above, the patterns for the flexures 116 and 117, the load beams 106 and 107, the carriages 104 and 105, and the support plate 180 of the flexible substrate 100 are integrally formed on the thin metal plate 12 by optical lithographic and etching processes and a plating process. Likewise the conductive patterns for the flexible substrate 100, the VCM coil sections 102 and 103, and the output signal lines 108 to 115 and 170 to 177 are integrally formed through the thin film layer 14 by optical lithographic and etching processes and a plating process. Thin film layer 14 is an insulation layer having flexibility.

At this time, as shown in FIG. 2, the shapes of the signal output lines 108 to 115 and 170 to 177 on the load beams 106 and 107 are adjusted in the optical lithographic and etching processes and in the plating process to balance the magnetic heads 150 and 151 and the VCM coil sections 102 and 103 at the center points C1 and C2 of the pivot bearings. Further, the areas of the signal output lines 108 to 115 and 170 to 177 are maximized in the optical lithographic and etching processes and in the plating process to reduce the electrical resistance of the magnetic heads 150 and 151.

As described above and respectively shown in FIG. 2, the actuator 32 comprises a flexure 116, a load beam 106, and a carriage 104 which are integrally formed. The actuator 34 comprises a flexure 117, a load beam 107, and a carriage 105 which are integrally formed. A plurality of these actuators 32 and 34 are joined together to form one actuator.

Overcoating is then performed. More particularly, pad portions 130 to 133 and 182 for performing soldering are left as opening portions. Overcoating by a permanent masking agent 19 is performed as shown in FIG. 1(C). For example, soldering resists for the polyimide cover layer and the flexible substrate of the laminated or UV-hardened type are used in screen printing, etc.

Thereafter, outer-shape removal work is performed with a pressing machine or an edge tool, and the outer-shape portions of the thin film layer 14 are removed.

Further, soldering pastes are printed on the pad portions 130 to 133 and 182 to form component mounting portions. Then a heat-ultraviolet-ray-combined hardening adhesive is dropped on the component mounting portions by a dispenser. Components such as the AE module circuit 183, chip components (not shown), and the magnetic heads 150 and 151 (shown in FIG. 4) are mounted on the component mounting portions. After this, these components are fixed by illuminating them with an UV lamp and passing them through a reflow furnace. At the same time, electrical connection is performed, so that the state shown in FIG. 1(D) is obtained.

Figure 5:
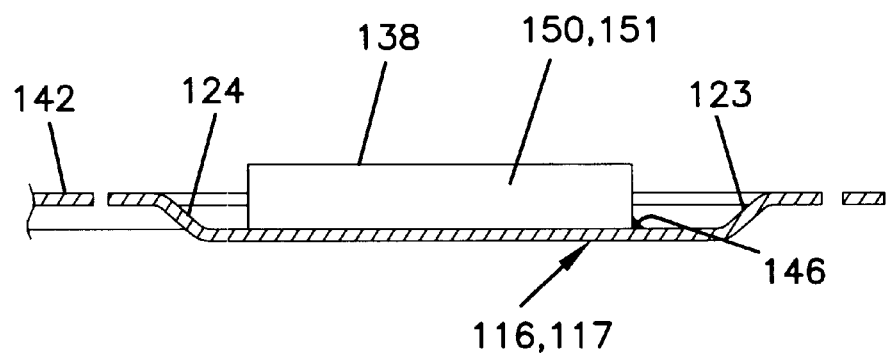
FIG. 5 is a sectional view taken substantially along line 5—5 of FIG. 2.

The bridge portions 123 and 124 of the flexures 116 and 117, as shown in FIG. 5, and fringe portions 192 to 195 and 22 of the load beams 106 and 107 are bent. Annealing treatment is then performed. Thereafter, the load beams 106 and 107 are bent along the worked portions 190, 191 and 24 to apply a gram load, so that the state shown in FIG. 1(E) is obtained.

Figure 6:
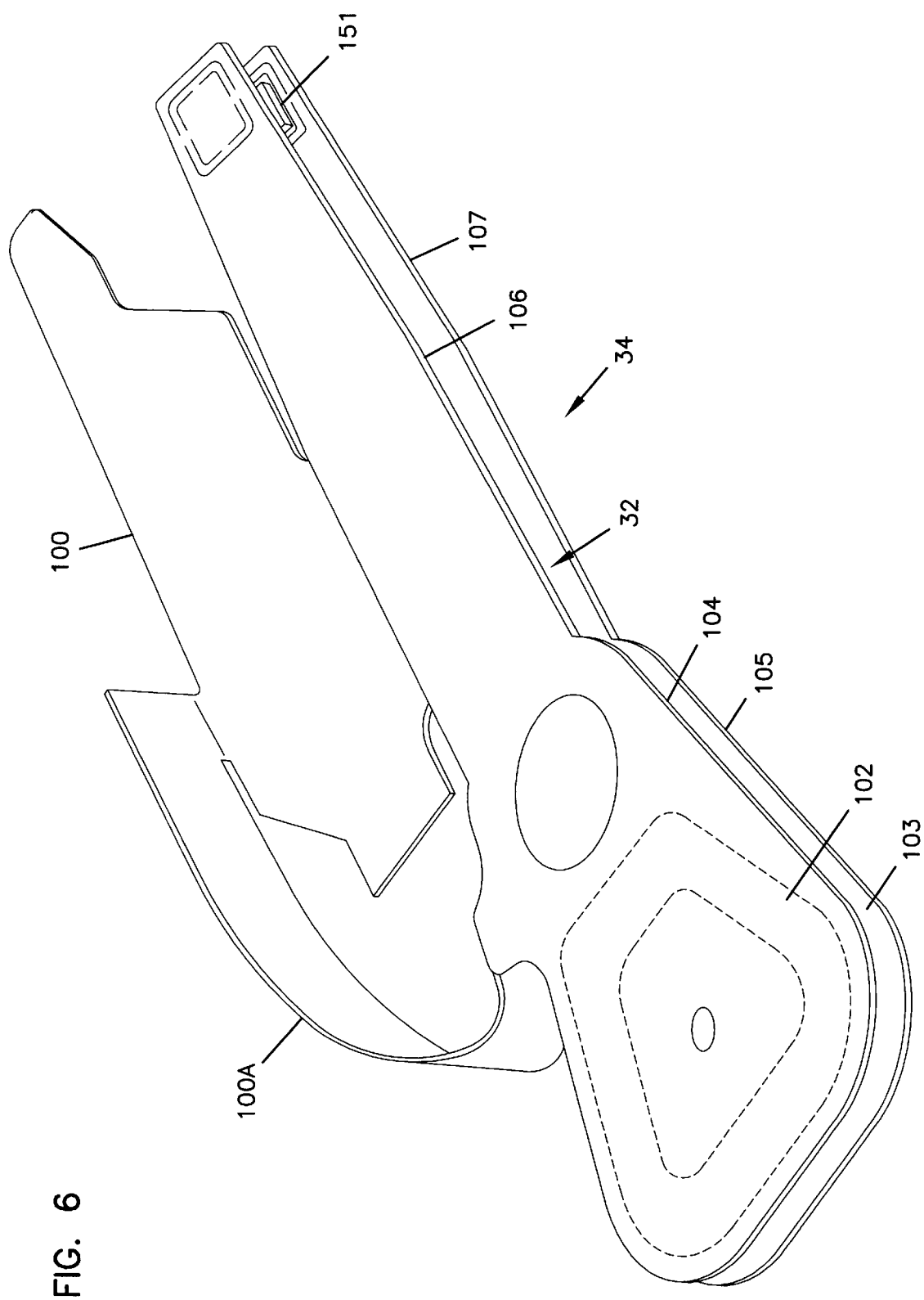
FIG. 6 is a perspective view of the assembled state of the head actuator according to the first embodiment of the present invention.

As shown in FIGS. 1(F) and 6, the upper and lower actuators 32 and 34 are overlapped so that the magnetic heads 150 and 151 are opposed. The pivot bearing 26 is then adhered and fixed. Referring to FIG. 2, the through bores 162 and 163 are connected with a conductive material 28 (See FIG. 1(F) 0 to connect the VCM coil sections 102 and 103 together as shown in FIG. 6. If the number of the magnetic heads is two or more, they will be stacked in the same way.

Finally, the output test of the magnetic heads 150 and 151 is performed by applying electricity from a terminal 184 on the flexible substrate 100 as shown in FIG. 2.

The structure of the head actuator according to this embodiment will hereinafter be described. As shown in FIG. 2, the thin metal plate 12, which is the material for forming the load beams 106 and 107, is integrally formed with the carriages 104 and 105 extending from the flexures 116 and 117, the VCM coil portions 102 and 103, and the support plate 180 of the flexible substrate 100. Further, the signal output lines 108 to 115 from the magnetic heads 150 and 151, and the signal lines 185 from the VCM coil sections 102 and 103 are connected directly and integrally to the flexible substrate 100 without any soldering connection. These carriages 104 and 105 are to be movable and supported on the main part of the disk drive (not shown) in which a disk is installed.

In addition, on the one hand, the load beams 106 and 107 are so thickened as to have rigidity by an electroplating method, while the four bridge portions 121 to 124 forming the flexures 116 and 116 are not electroplated to make the flexures thin and keep the rigidities of the flexures low. Among these four bridge portions, at least one set of opposed bridge portions 123 and 124 are bent to the reverse side of a slider surface 138 in such a manner that the height from the slider surface 138 to a load beam surface 142 can be reduced, as shown in FIG. 5.

Figure 4:
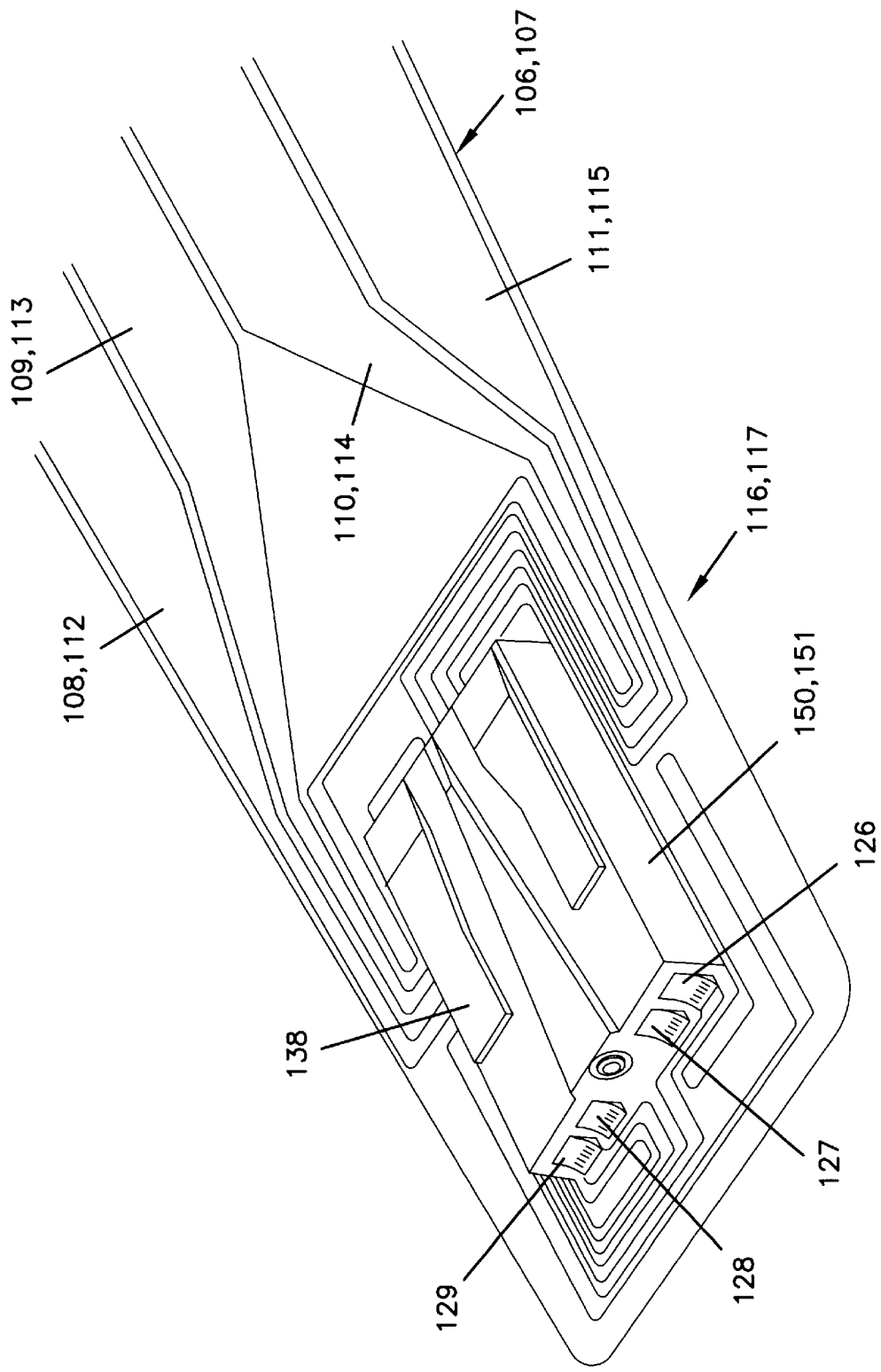
FIG. 4 is an enlarged perspective view of the flexure of the head actuator according to the first embodiment of the present invention having a magnetic head being installed on the flexure.

On the other hand, as shown in FIGS. 3 and 4, the four bridge portions 121 to 124 are formed with two or four head circuits 134 to 137 for transmitting the output signals of the magnetic heads 150 and 151. Further, the head circuits 134 to 137 continuously extend on the surfaces of the flexures 116 and 117 on which the magnetic heads 150 and 151 comprising a thin film head or a magneto resistive (MR) head are adhered. The pads 130 to 133, which become the electrodes of the head circuits 134 to 137, are formed at the positions at which the pads contact electrodes 126 to 129 formed on the side walls of the magnetic heads 150 and 151. Futhermore, the pads 130 to 133 and the electrodes 126 and 129 are connected by a soldering bridge 146 by reflow soldering, or by supersonic wave bonding to gold wires so that the magnetic heads 150 and 151 and the head circuits 134 to 137 are connected electrically.

In addition, as shown in FIG. 2, the output signal lines 108 to 115 for transmitting the outputs of the magnetic heads 150 and 151 on the load beams 106 and 107 are made wide and thick. With this, the electric resistance is reduced, so that the signal-to-noise (SN) ratio can be enhanced without attenuating the signals output from the magnetic heads 150 and 151. With this structure, the output lines 108 to 115 can be constructed such that the VCM coil sections 102 and 103 and the magnetic heads 150 and 151 are balanced. Further, the output signal lines 108 to 115 are constructed so that the vibration prevention effect by the load beams 106 and 107 can be obtained by making use of the output lines being able to be formed into an arbitrary shape in the optical lithographic and etching processes and the plating process on the insulation.

The operation of the head actuator and the advantages of the fabrication method according to this first embodiment will hereinafter be described.

As described above, the signal output lines 108 to 115 are deposited on the load beams 106 and 107, and also the flexible substrate 100, the output signal lines 108 to 115 connected to the magnetic heads 150, 151, and the VCM coil sections 102, 103 are integrally formed with a sheet of conductive material. For this reason, the signal lines from the magnetic heads 150 and 151 do not need to be covered with insulation tubing. Therefore a main factor for high cost resulting from the use of urethane-covered lines is eliminated.

In addition, clip components for fixing the insulation tubing do not need to be provided. Therefore the thinning of a shape is further promoted. In addition, since the load beams 106, 107, flexures 116, 117, and carriages 104, 105 are integrally formed with the composite material 18, it becomes unnecessary to provide them individually and join them together. As a result, it also becomes possible to dispense with a joined portion which normally becomes thick. Finally since it becomes unnecessary to provide a base plate, the thinning of a shape is facilitated.

Since the components are integrally formed with the composite material 18, the actuators 32 and 34 can be effectively prevented from vibrating. Accordingly, a series of processes for adhering damper plates become unnecessary and a reduction in the cost can be promoted.

Further, if a stainless plate is used as the thin metal plate 12, polyimide semipolymer is used as the thin film layer 14, and a rolled copper leaf is used as the thin metal plate 16, the corrosion resistance of the thin metal plate 12 will be enhanced, the conductivity of the thin metal plate 16 will become better, and the thin metal plate 12 and the thin metal plate 16 will be reliably joined by polyimide polymerization.

In addition, since the bending work of the clip components is omitted, there is no disconnection of a wire and no adverse effect on the vibration characteristic of the load beams 106, 107. Further, since the urethane-covered wires do not need to be covered with an insulation tubing after the magnetic heads and the urethane-covered wires have been bonded, there is no fluctuation in the floating positions of the magnetic heads 150 and 151.

A second embodiment of the head actuator and the fabrication method of the head actuator according to the present invention will be described based on FIGS. 7 to 12.

Figure 7:
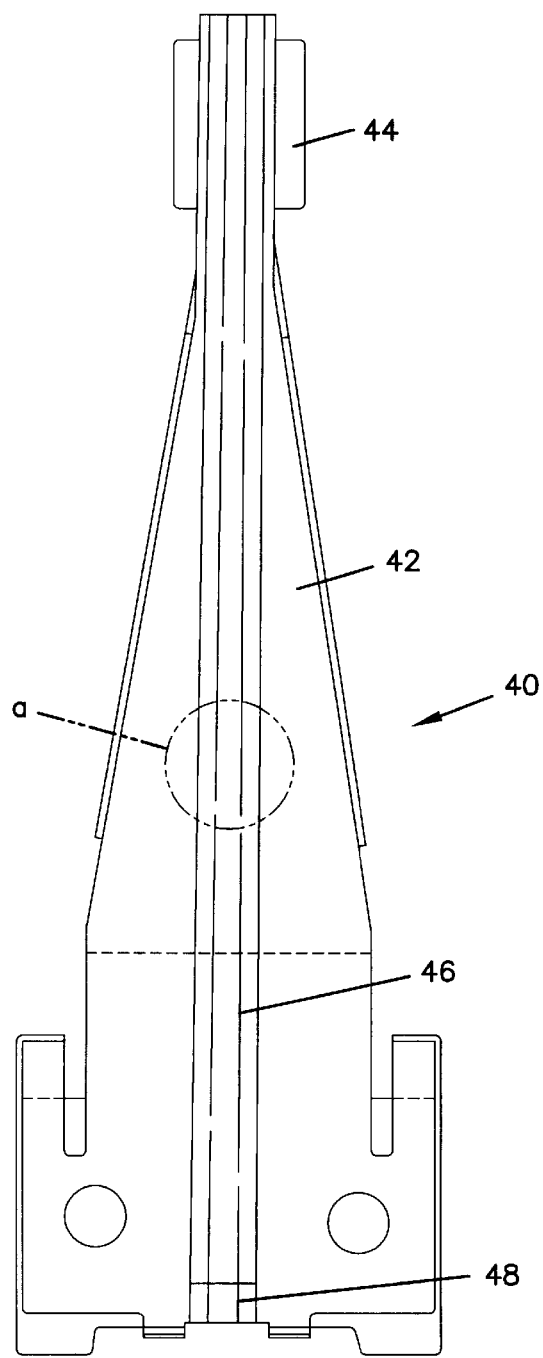
FIG. 7 is a plan view of a head actuator according to a second embodiment of the present invention.

An actuator 40, which is a head actuator for a hard-disk drive according to this embodiment, is shown in FIG. 7. A signal line laminated portion 46 is disposed on the upper side of a load beam 42 of the actuator 40. A first embodiment of the signal line laminated portion 46 is enlarged and shown in FIG. 8.

Figure 8:
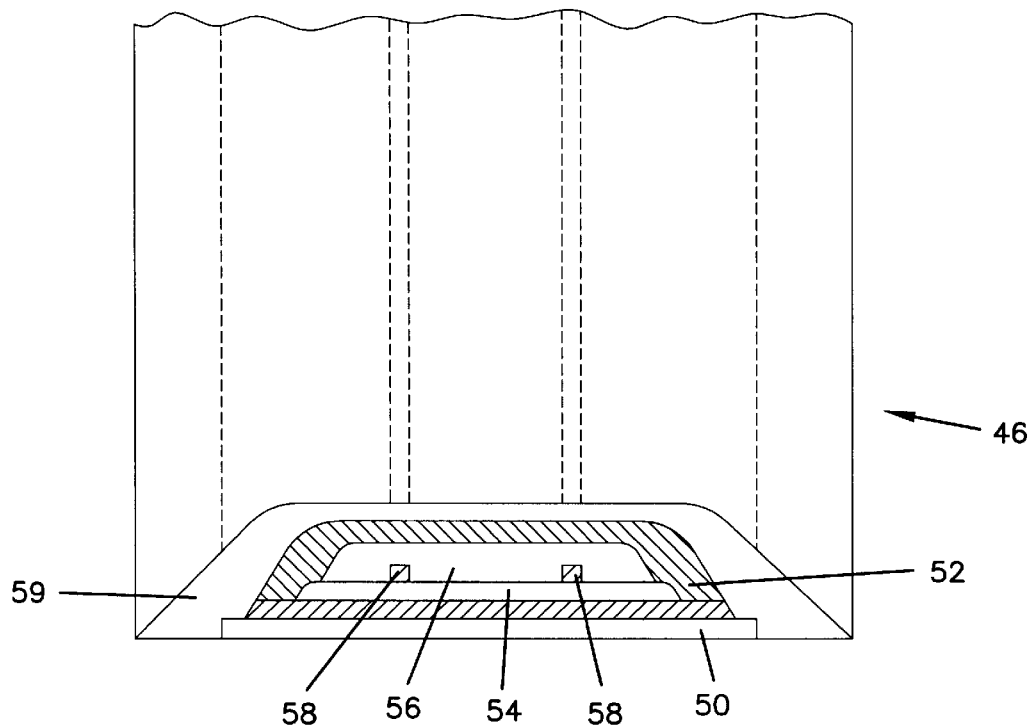
FIG. 8 is an enlarged sectional view of a first embodiment of the signal line lamination portion of FIG. 7.

As shown in FIG. 8, a shielding layer 52, which is a ground line whose cross section is formed into an annular shape, is disposed on a lower base layer 50. Within this shielding layer 52, a pair of signal lines 58 are interposed between the lower base layer 54 and an insulation layer 56. It is to be noted that a protective layer 59 is formed on the outer side of the shielding layer 52.

Therefore, signals are transmitted by these signal lines 58 between a magnetic head 44 and an AE module circuit (not shown) on a carriage 96. At this time, since the whole of the signal lines 58 is covered with the shielding layer 52, they become strongly resistant to noises from the outside.

Figure 9:
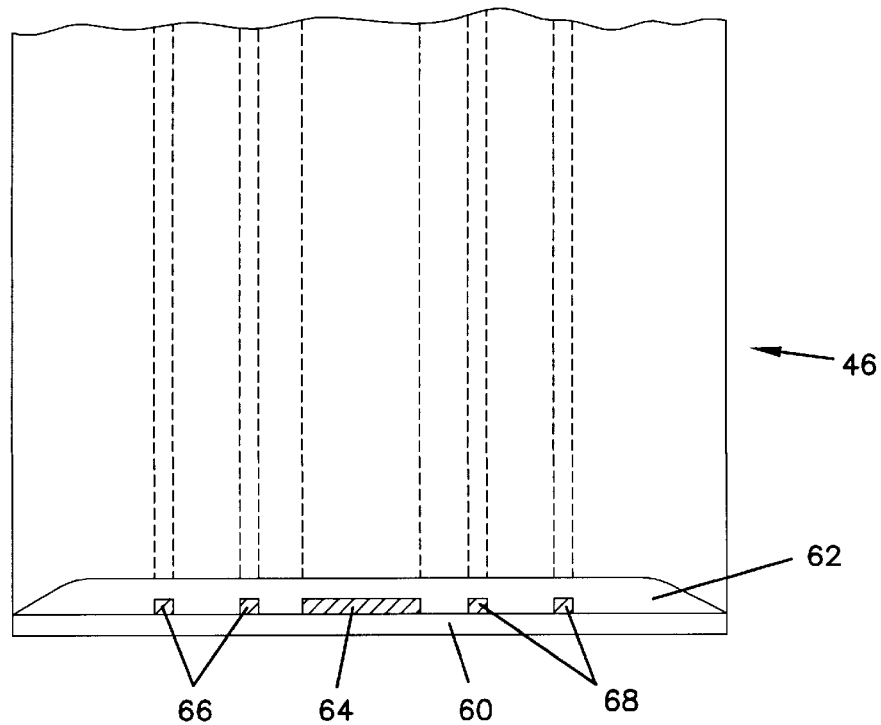
FIG. 9 is a sectional view of a second embodiment of the signal line lamination portion of FIG. 7.

In addition, a structure such as that shown in FIG. 9 can be conceived as a second embodiment of the signal line laminated portion 46. According to this embodiment, a pair of write signal lines 66 and a pair of read signal lines 68 are interposed between a base layer 60 and a protective layer 62, and are so disposed as to interpose a ground line 64 therebetween.

Therefore, signals are transmitted by these signal lines 66 and 68 between the magnetic head 44 and the AE module circuit (not shown) on a carriage 96. The crosstalk between a pair of write signal lines 66 and a pair of read signal lines 68 is reduced by the ground line 65.

Figure 10:
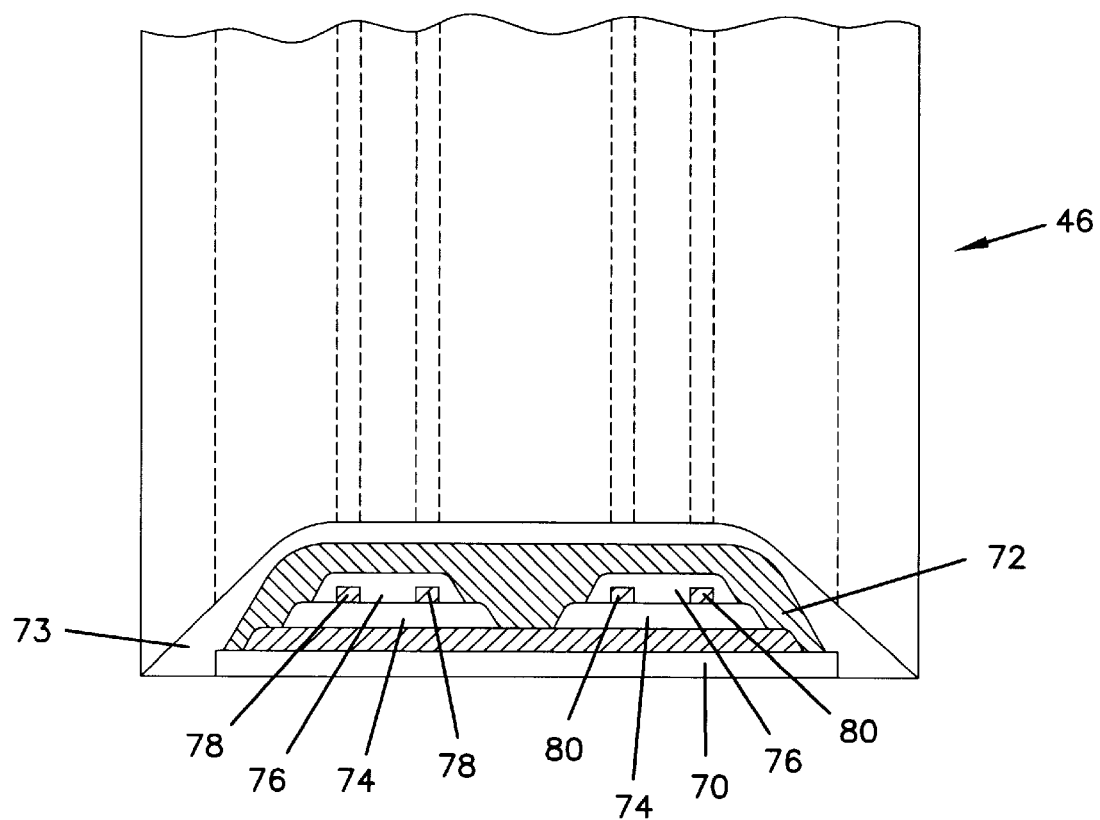
FIG. 10 is a sectional view of a third embodiment of the signal line lamination portion of FIG. 7.

Further, a structure such as that shown in FIG. 10 can be conceived as a third embodiment of the signal line laminated portion 46. According to this modification, a shielding layer 72, which is a ground line whose cross section is formed into an annular shape, is disposed on a lower base layer 70. Within this shielding layer 72, a pair of write signal lines 78 and a pair of read signal lines 80 are interposed between an upper base layer 74 and an insulation layer 76. Further, the shielding layer 72 is so constructed as to separate a pair of the write signal lines 78 and a pair of the read signal lines 80. A protective layer 73 is formed on the outer side of the shielding layer 72.

Therefore, signals are transmitted by these two pairs of signal lines 78 and 80 between the magnetic head 44 and the AE module circuit (not shown). At this time, the crosstalk between a pair of write signal lines 78 and a pair of read signal lines 80 is reduced by the shielding layer 72.

A fabrication method for a third embodiment of a head actuator according to the present invention is shown in FIG. 11 with the signal line laminated portion 46 further enlarged.

Figure 11A:
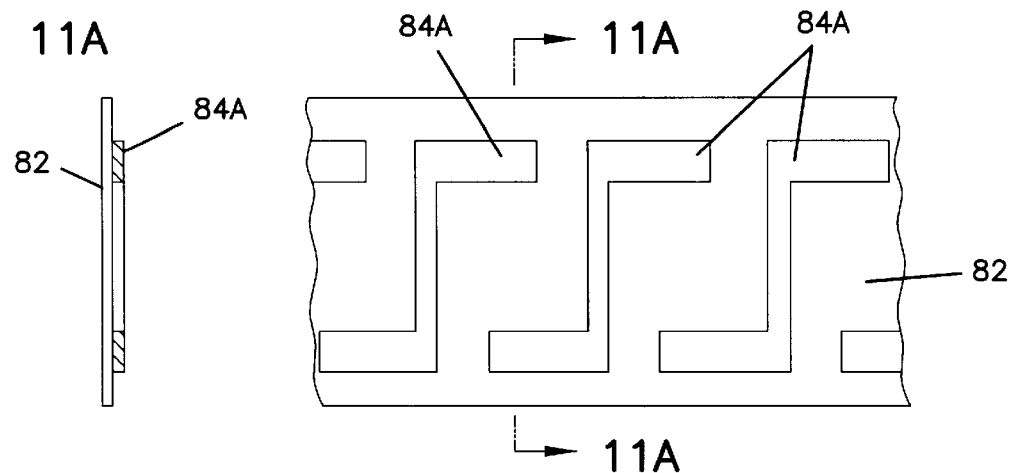
FIGS. 11(A)–(D) are diagrams of a fourth embodiment of the signal line lamination portion of FIG. 7.

As shown in FIG. 11(A), a plurality of conductive portions 84A of an inverted Z shape are first formed on a base layer 82 so that they are arranged along the direction in which the signal line laminated portion 46 extends.

Figure 11B:
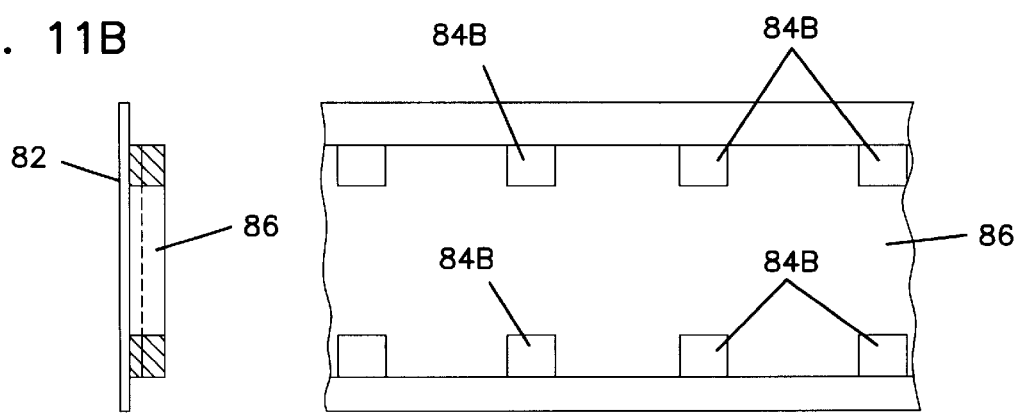

Thereafter, as shown in FIG. 11(B), a plurality of conductive portions 84B is formed by selective electroplating, as in the first embodiment. That is, after masking by an insulation layer 86, the conductive portions 84B, which are opening portions unmasked, are plated with a thick metal film by electroplating.

Figure 11C:
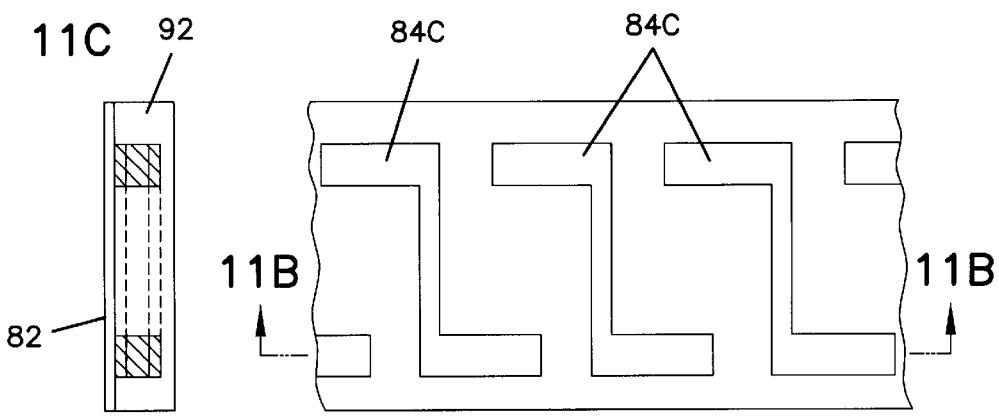

Further, the selective electroplating is likewise performed on the conductive portions 84B and, as shown in FIG. 11(C), conductive portions 84C of a generally Z shape are plated with a metal, so that a pair of signal lines 90A and 90B extend while crossing each other. A plurality of signal line pairs 90A and 90B are covered with a protective layer 92. The protective layer 92 is an insulating material.

Figure 11D:
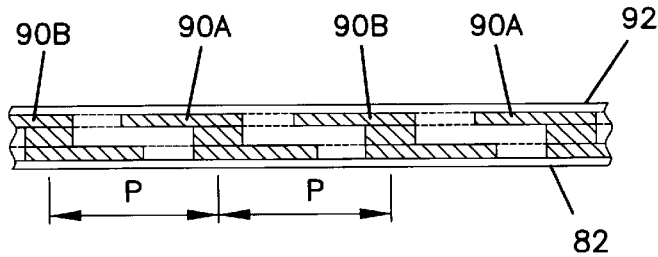

As a result, as shown in FIG. 11(D), there is accomplished a structure where a pair of signal lines 90A and 90B extends at a predetermined pitch P while crossing each other. That is, the signal lines do not always need to be formed into a straight shape. Since the shape of the signal line is rather freely formed by masking, optimum signal lines can be made. More particularly, an external noise preventive region can be changed by changing pitch P.

In addition, instead of a generally inverted Z shape or a generally Z shape, the conductive portion may also be formed into a straight shape extending in a direction crossing the direction that the signal line laminated portion 46 extends. Further, as with other modifications, the signal lines 90A and 90B may be covered with a shielding layer.

With the above-described embodiments, there is no danger of contact between wiring and a disk thereby shorting the signal paths. The actuator 40 can be easily made thin because the signal lines are deposited and arranged on the load beam 42. In addition, mass production also becomes easy since the signal lines are written directly on the load beam 42 and deposited on the load beam.

It is to be noted that the material of the conductive portion may be constructed using copper, aluminum, and gold as the base layer and, the protective layer, may be formed by a resin material such as polyimide, and, an insulation layer, may be formed using silicon dioxide.

This embodiment can may be fabricated by a first method using photoresists and chemical etching or by a second method of adhering a flexible cable to a load beam.

The first method is a method of writing the signal line directly on the load beam which is suitable for mass production techniques. If used in a thin film head, the first method will become particularly effective. The signal lines written on the gap of the magnetic head and on the load beam may be wired with gold wires. Thin wires such as those used in an MIG head may be soldered to one end of the load beam.

Figure 12:
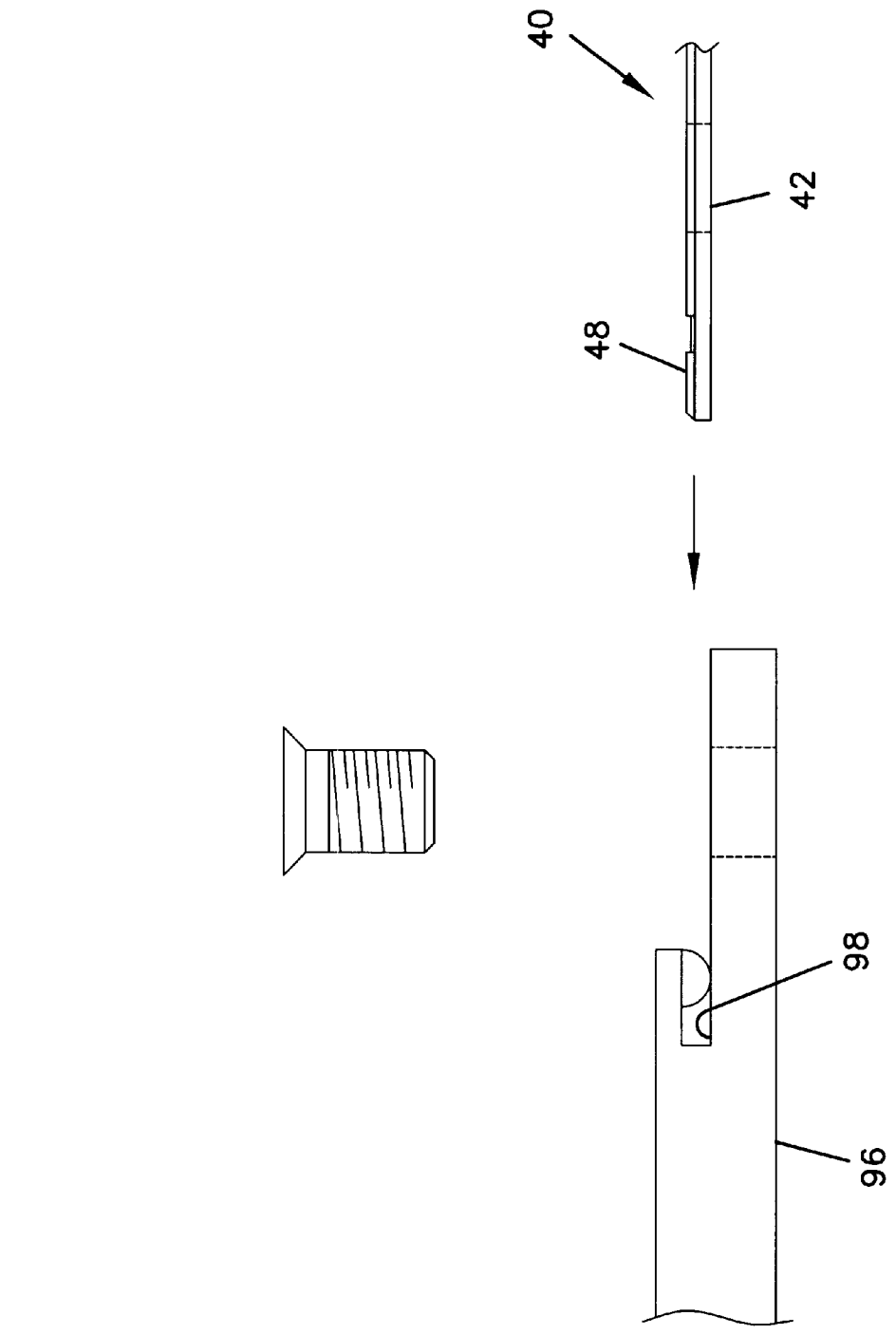
FIG. 12 is a side view used to explain how the head actuator according to the second embodiment of the present invention is connected to a carriage.
Figure 13:
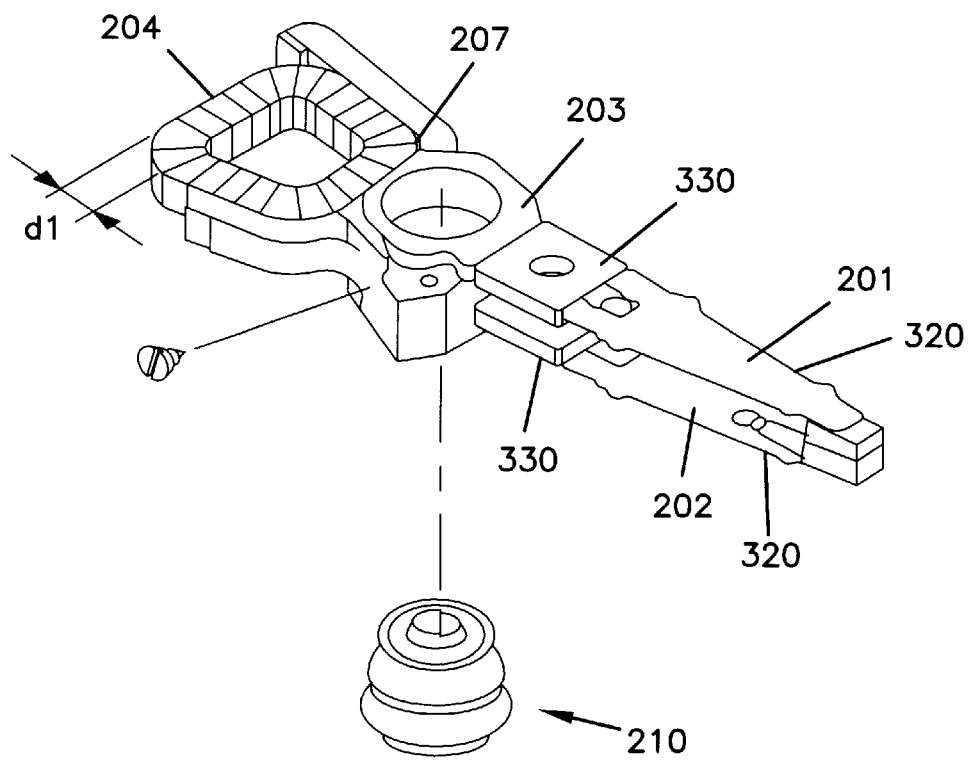
FIG. 13 is an exploded perspective view of a head actuator according to prior art.
Figure 14:
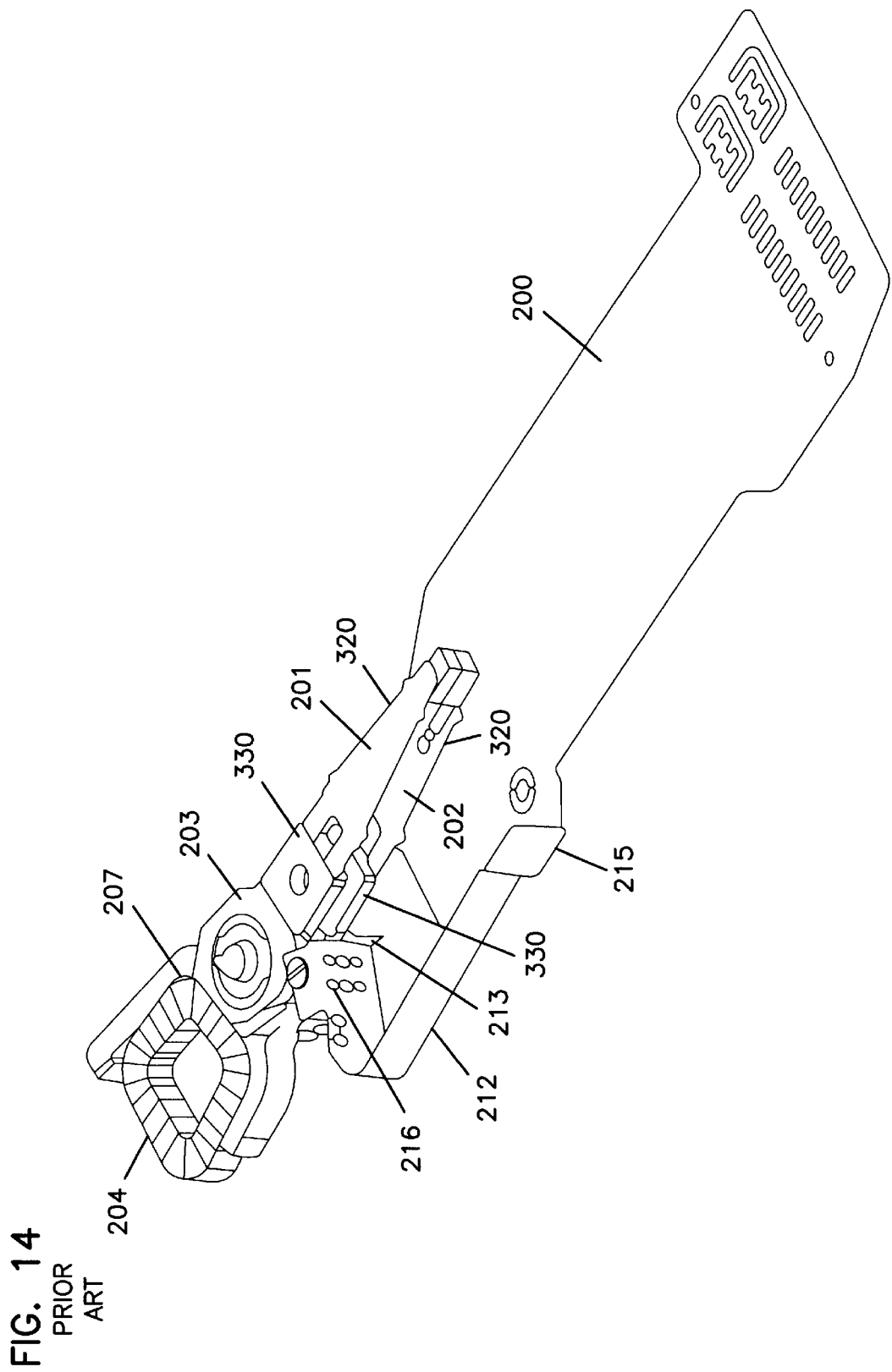
FIG. 14 is a perspective view of the prior-art head actuator in its assembled state.
Figure 15:
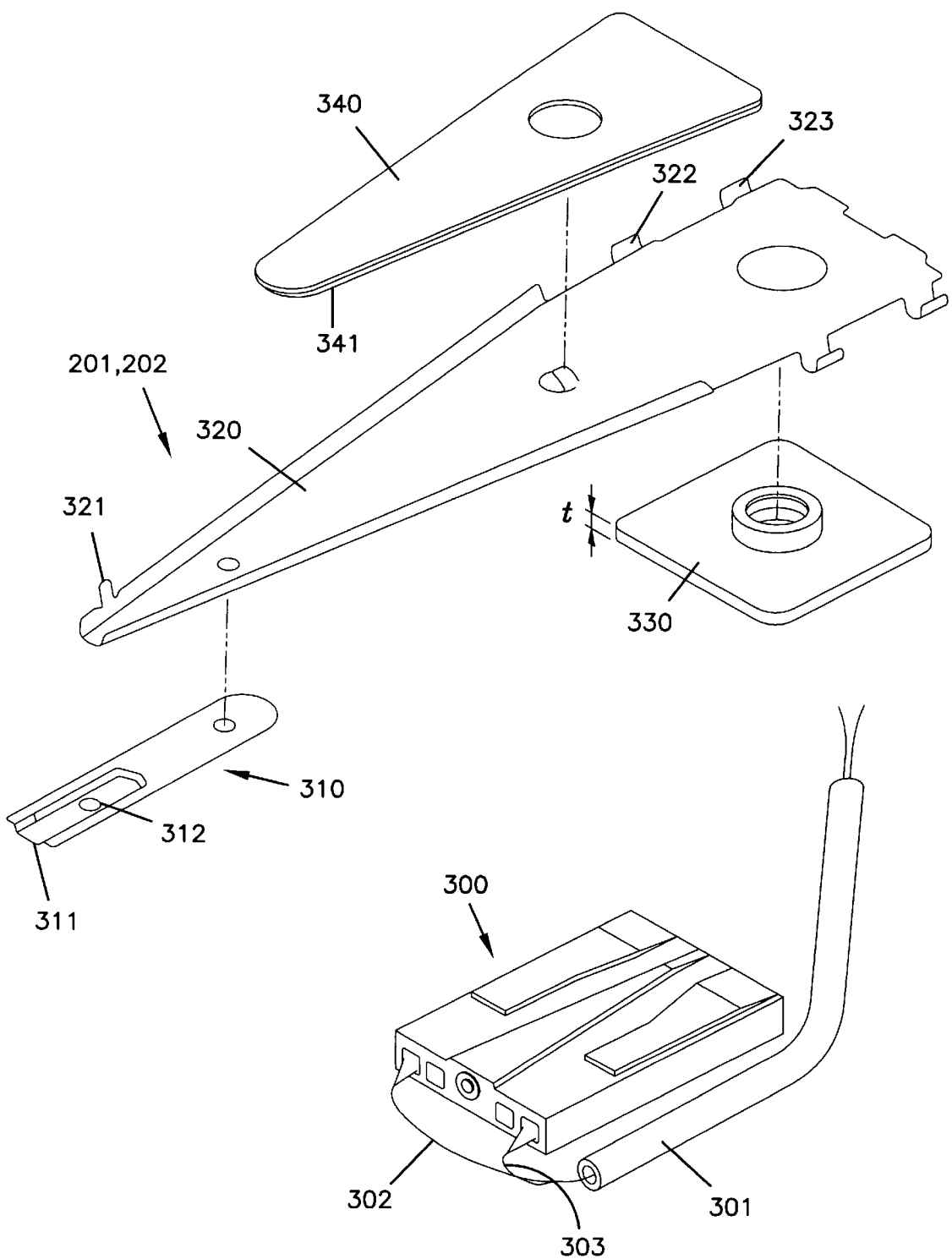
FIG. 15 is an exploded perspective view of the load beam periphery of the prior-art head actuator.
Figure 16:
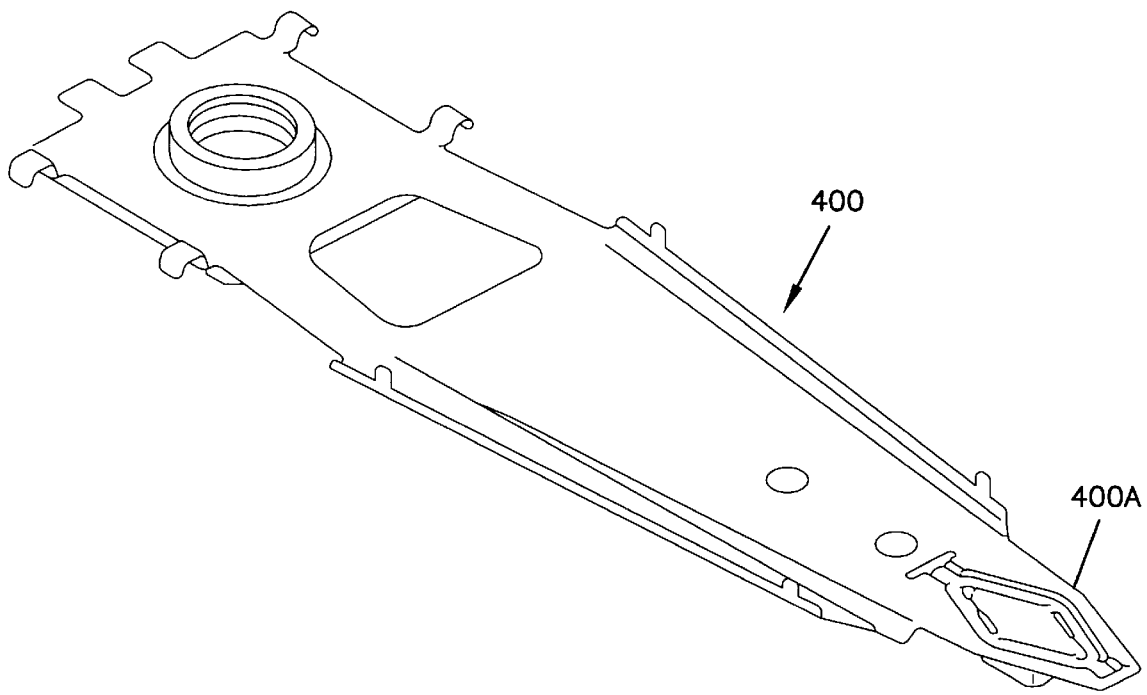
FIG. 16 is a perspective view of the load beam of a head actuator according to another prior art.

The second method is a method of extending and adhering the flexible cable extended to the carriage to the load beam 42. This method is particularly effective in a case where the carriage and the actuator are one united piece. Also, when only the load beam 42 is produced separately, the electrode portion 48 of the mounting portion is exposed as shown in FIG. 7 and inserted into a female connector 98 of a carriage 96 and connected to the carriage 96 by means of a screw, as shown in FIG. 12.

It is to be noted that a problem such as inductance and capacitance can be reduced by making the AE module circuit close to the gap of the magnetic head. For example, if a circuit is incorporated into the load beam itself, the load beam is to be expanded to a load beam integral with an AE module circuit.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for fabricating an actuator, comprising;
   forming a flexible composite material;
   selectively processing portions of the composite material to form two integral actuator components, each actuator component including a flexure, a load beam, and a carriage; and
   joining the two actuator components to form a unified, planar actuator assembly.

2. The method of claim 1, wherein the carriages further comprise a voice coil motor coil section.

3. The method of claim 1, wherein only one of the actuator components is formed to integrally include a support plate.

4. The method of claim 1, wherein the step of forming the flexible composite material includes the step of forming an insulating film between first and second metal plates.

5. The method of claim 4, wherein the step of selectively removing portions of the composite material includes the step of selectively removing portions of the first metal plate to form the flexures, load beams and carriages.

6. The method of claim 5, wherein the step of selectively removing portions of the first metal plate includes the steps of:

masking the first metal plate to expose the portions of the first metal plate to be removed; and removing the exposed portions of the first metal plate to form the flexures, load beams and carriages.

7. The method of claim 6, wherein the step of removing the exposed portions of the first metal plate includes the step of removing portions of the second metal plate underlying the portions of the first metal plate.

8. The method of claim 5, further including the step of selectively removing portions of the second metal plate to form voice coil motor coil sections.

9. The method of claim 8, wherein the step of selectively removing portions of the second metal plate includes the step of forming conductive patterns.

10. The method of claim 9, wherein the conductive patterns include circuitry for a read/write head.

11. The method of claim 10, wherein the conductive patterns include output signal lines, the output signal lines being formed on the load beams.

12. The method of claim 11, further including the step of adjusting shape of the output signal lines to balance the actuator at a pivot point.

13. The method of claim 11, further including the step of maximizing a shape of the output signal lines to increase the area of the output signal lines for reducing the resistance thereof.

14. The method of claim 5, wherein the step of selectively removing portions of the first metal plate includes the step of forming a flexible plate proximate the carriages.

15. The method of claim 5, wherein the step of selectively removing portions of the first metal plate includes the step of forming a support plate proximate the carriages.

16. The method of claim 5, further including the step of selectively forming a relative thick metal film on the second metal plate.

17. A method for fabricating an actuator, comprising the steps of:

forming an insulating film between first and second metal plates;

selectively masking the first metal plate to expose portions of the first metal plate;

removing the exposed portions of the first metal plate and underlying portions of the insulating film and second metal plate to form two integral actuator components, each actuator component including a flexure. a load beam, and a carriage, one of the actuator components integrally including a support plate;

selectively masking the second metal plate to expose portions of the second metal plate;

removing the exposed portions of the second metal plate to form conductive patterns on the second metal plate; and joining the two actuator components to form a unified, planar actuator assembly.

* * * * *

UNITED STATES PATENT AND TRADEMARK OFFICE
CERTIFICATE OF CORRECTION

PATENT NO.    : 5,970,602
DATED         : October 26, 1999
INVENTOR(S)   : Harada et al.

It is certified that error appears in the above-identified patent and that said Letters Patent is hereby corrected as shown below:

<u>Title page,</u>
Item [75], Inventors, after "Keiichi Iwasaki", please replace "Fujisawa" with
-- Kanagawa-ken --.

<u>Column 11,</u>
Line 28, please insert -- a -- after "adjusting".

Signed and Sealed this

Eighth Day of October, 2002

Attest:

JAMES E. ROGAN
Attesting Officer           Director of the United States Patent and Trademark Office